(12) United States Patent
Paranjpe et al.

(10) Patent No.: US 10,497,346 B2
(45) Date of Patent: Dec. 3, 2019

(54) THREE-DIMENSIONAL SIMULATION SYSTEM (71) Applicants: 2236008 Ontario Inc., Waterloo (CA); BlackBerry Limited, Waterloo (CA)

(72) Inventors: Shreyas Anand Paranjpe, Burnaby (CA); Phillip Alan Hetherington, Port Moody (CA); Leonard Charles Layton, Burnaby (CA)

(73) Assignees: 2236008 Ontario Inc., Waterloo (CA); BlackBerry Limited, Waterloo (CA)

(*) Notice: Subject to any disclaimer, the term of this patent is extended or adjusted under 35 U.S.C. 154(b) by 60 days.

(21) Appl. No.: 15/839,348

(22) Filed: Dec. 12, 2017

(65) Prior Publication Data

US 2018/0190248 A1  Jul. 5, 2018

Related U.S. Application Data (60) Provisional application No. 62/442,297, filed on Jan. 4, 2017.

(51) Int. Cl.
  *G06K 9/00*  (2006.01)
  *G10H 1/00*  (2006.01)
  (Continued)

(52) U.S. Cl.
  CPC .......... *G10H 1/0008* (2013.01); *B60W 30/025* (2013.01); *G06F 3/016* (2013.01);
  (Continued)

(58) Field of Classification Search
  CPC ........... G10H 1/0008; G10H 2201/201; G10H 2201/241; G10H 2201/401; G01C 21/362;
  (Continued)

(56) References Cited

U.S. PATENT DOCUMENTS 10,133,470 B2 * 11/2018 Han ..................... G06F 3/0487
2013/0259238 A1 * 10/2013 Xiang .................... G06F 3/017
   381/17

(Continued)

FOREIGN PATENT DOCUMENTS

WO      2014070872       5/2014
WO   WO-2014070872 A2 *  5/2014

OTHER PUBLICATIONS

Extended European Search Report; EP18150297.2; dated Jun. 14, 2018.

(Continued)

*Primary Examiner* — Jose L Couso
(74) *Attorney, Agent, or Firm* — Ridout and Maybee LLP (57) ABSTRACT

A multimodal system and process processed one or more sensor signals and extracts features from the one or more sensor signals through a spatiotemporal correlation between consecutive frames of an image or video sequence. The multimodal system and process determines the movement and direction of the features through an image subtraction, or a coherence measure and synthesizes a musical instrument signal in response to the detected movement and direction or the triggers. The imaginary musical instrument signal is added to an infotainment signal within a vehicle.

19 Claims, 5 Drawing Sheets

(51) Int. Cl.
*G06F 9/30* (2018.01)
*B60W 30/02* (2012.01)
*G06F 3/01* (2006.01)

(52) U.S. Cl.
CPC ..... *G06F 9/30003* (2013.01); *G06K 9/00335* (2013.01); *G06K 9/00375* (2013.01); *G06K 9/00711* (2013.01)

(58) Field of Classification Search
CPC ............ B60K 35/00; B60K 2350/1024; B60K 2350/1052; B60K 2350/1072; B60K 2350/965; B60K 2350/1044; B60K 37/00; B60W 30/025; G06F 3/016; G06F 3/017; G06F 3/038; G06F 3/011; G06F 3/013; G06F 3/0304; G06F 3/04815; G06F 3/0482; G06F 3/0487; G06F 3/14; G06F 3/1454; G06F 3/16–167; G06K 9/00335; G06K 9/00355; G06K 9/00375; G06K 9/00711; G02B 2027/014; G02B 2027/0178; G02B 2027/0187; G02B 27/017; G02B 27/0093; G06T 11/00; G06T 19/006; G09G 3/003; G10L 15/00; G10L 2015/223; G10L 2015/226
See application file for complete search history.

(56) References Cited

U.S. PATENT DOCUMENTS

| | | | | |
|---|---|---|---|---|
| 2013/0275875 | A1* | 10/2013 | Gruber | G10L 15/22 715/728 |
| 2014/0058584 | A1* | 2/2014 | Weng | G06F 7/00 701/1 |
| 2014/0098128 | A1* | 4/2014 | Fein | G06F 3/011 345/633 |
| 2014/0145931 | A1* | 5/2014 | Kim | B60K 35/00 345/156 |
| 2014/0270382 | A1* | 9/2014 | Cheng | G06K 9/00355 382/104 |
| 2016/0313868 | A1* | 10/2016 | Weng | G06F 3/017 |
| 2016/0328021 | A1* | 11/2016 | Lee | G06F 3/011 |
| 2017/0047056 | A1* | 2/2017 | Lee | G06F 9/451 |
| 2017/0078825 | A1* | 3/2017 | Mangiat | H04S 7/40 |
| 2017/0091983 | A1* | 3/2017 | Sebastian | G06T 1/20 |
| 2018/0107278 | A1* | 4/2018 | Goel | G06F 3/017 |

OTHER PUBLICATIONS

Communication Pursuant to Article 94(3); EP18150297.2 dated Aug. 20, 2019.

* cited by examiner

THREE-DIMENSIONAL SIMULATION SYSTEM

PRIORITY CLAIM

This application claims priority to U.S. Provisional Patent Application No. 62/442,297 filed Jan. 4, 2017, titled "Three-Dimensional Simulation System," which is herein incorporated by reference.

BACKGROUND OF THE DISCLOSURE

Technical Field

This disclosure relates to simulations and in particular, to a multimodal user interface that allows a user to interact with the system by movements and voice commands.

Related Art

Singing in a vehicle while playing an imaginary or virtual instrument is a popular way for a driver and other occupants to entertain themselves. Even though occupants are often constrained by seat belts, they can still move around within a vehicle and play an imaginary instrument, tap their fingers in time with a rhythm, or accent a chord by "punching the air". While this behavior can be amusing, it also reduces driver fatigue that impairs mental processing and decision making that increases the risks of accidents.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

A multimodal user interface provides a natural, efficient, and easy method of controlling an application in a vehicle. The interface allows users to interact with tangible and virtual technology in intuitive ways allowing users to control applications such as a synthesizer or a vehicle through natural human interactions or movements unlike conventional methods that rely on a physical input such as a keyboard and a mouse. The multimodal interface enables bi-directional communication allowing application programs to receive user's interactions as input and users to receive perceptible responses by feel, sound (e.g., tactile feedback), and/or a two or three dimensional vision system. The multimodal user interface receives and process multiple virtual inputs at once allowing the interfaces to serve two or more applications running concurrently unlike conventional interfaces. The multimodal interface is application independent and processes an array of sensor input that is unobtrusive and do not rely exclusively on proximity to operate.

Figure 1:
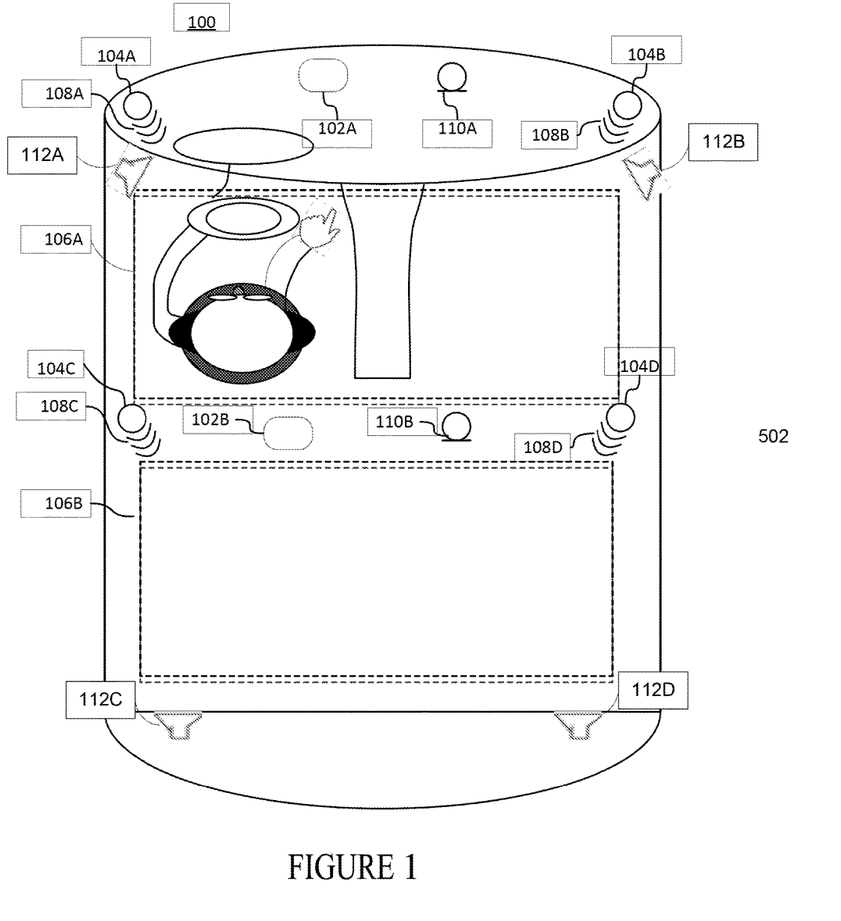
FIG. 1 is an overhead schematic view of a multimodal user interface that translates user interactions into actions in a virtual environment.

FIG. 1 is an overhead view of a multimodal user interface that translates user interactions into actions in a virtual environment rendered within a vehicle 100. While shown as a unitary part of vehicle 100 it may be an accessory or a component part of the vehicle of FIG. 1. In vehicle 100 the driver and one or more co-drivers (not shown) or other passengers' movement and utterances are captured by various sensors. Ultrasound, vision, and sound tracks movements, hand and arm gestures, voice through vision and wave based approaches. In FIG. 1, ultrasonic sensors 104 A through D transmit high frequency sound pulses 108 A though D that cannot be heard but reflect off of persons and objects. A built in receiver measures the period of time reflections or echo that is transmitted back allowing the sensors to determine the speed, rate of change (e.g., acceleration), and direction of a movement. Video devices 102 A and B detect, track, recognize, and in some systems supplement the detection of hand and arm movements or speech (e.g., through lip movement) tracked through the ultrasonic sensors. Although some systems detect and track movement through coded gloves, such as Radio Frequency Identification Tag (RFID) gloves, in FIG. 1 some multimodal user interface uses an appearance based technique to extract image features from the images rendered by video display devices 102 A and B to model the visual appearance of lips, hand and arm gestures. In FIG. 1 microphone signals are captured by microphones 110 A and B and transducers 204 A through D convert electrical signals into aural signals.

Figure 2:
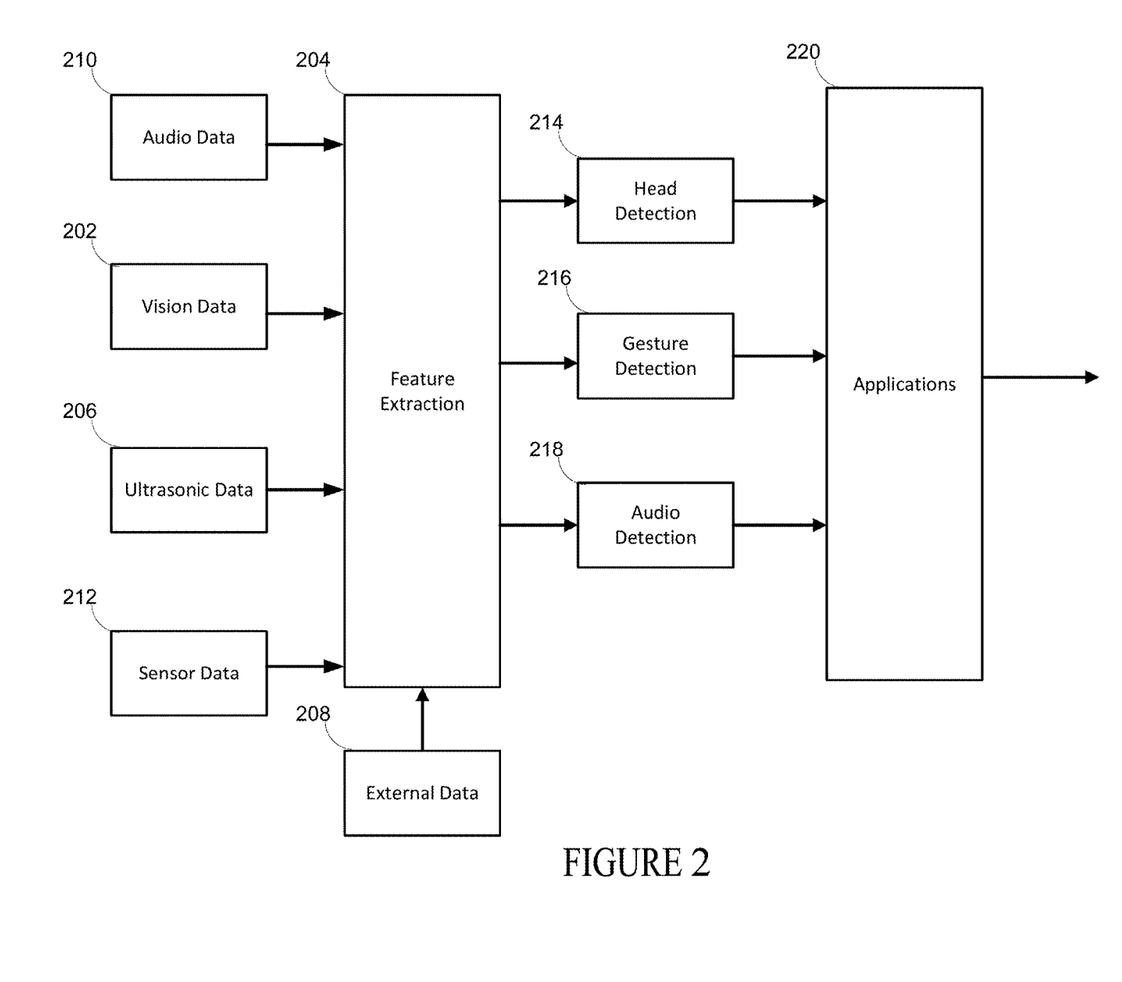
FIG. 2 is a multimodal user interface that translates user interactions into actions in a virtual environment.

In FIG. 2 a feature extraction module 204 detects, tracks, and recognizes gestures and movements including simulations such as when driver or occupant's behavior pretending to play the riffs and solos of an air guitar, for example through a spatiotemporal correlation. In the exemplary multimodal user interface of FIG. 2 at least two consecutive frames of video frames or visual data 202 rendered by the video devices 102 A and B are stored in a scalable queue with location data in a memory. The first image fame is designated the prior frame and the second image frame is designated the current frame. Through similarity or coherence detectors, the difference between the locations between an arm, hand, lips, or head through space and time, respectively, for example, from the prior frame to the current frames is determined to render a dynamic hand, arm, gesture, and speech (through lip reading) detection, a movement direction, an acceleration, and/or space relation between the two video frames or visual data. In addition, or in alternative systems detection and direction is identified through triggers that are activated by a level exceeding predetermined thresholds. And, in another alternative or supplement to some multimodal user interface systems comprises an array of pressure or touch sensors that recognize touch and movement that do not apply feature detection. The speed, acceleration, and direction of the movement may also be concurrently tracked through ultrasonic data 206 sourced through the ultrasonic sensors 104 A and D.

In FIG. 2, external data 208 sourced by external sensors, such the accelerometers or global positioning sensors that are part of wireless devices (not shown), for example, are used to recognize vehicle 10 state (e.g., parked, accelerating, traveling at highway speeds), and/or the motion of the user. For example, if an accelerometer is subject to very fast transient motions, such as motions that simulate a very fast periodic up-and-down motion that cause a user's hand or arm to move back and forth or moving quickly over a short predetermined period of time in close proximity to one location, an air drumming may be recognized by comparing the repetitive periodic motions represented in the external sensor data 206 against bag-of-features representations stored in the memory. Audio data 210 is also processed to identify speech through an automatic speech recognition module (not shown) and physical contact that generates sound such as a hand rapidly striking a surface followed by a rapid rearticulation. The sound may comprise soundmarks that distinguish the sound generated by contact with one physical surface from the sound generated from contact with another physical surface. In FIG. 2 other sensors data 212 such as pressure sensor data sensed from a steering wheel, a dash board, or console is also processed and monitored in time to determine and categorize the magnitude and the direction of one or more continuous or discontinuous motions.

In FIG. 2, the use of touch, sound and high frequency waves, vision systems and/or sensors multimodal user interface can detect head 214, gesture 216, and audio 218 that can be processed by application-independent software platforms 220. Using a rule based-process, the identified actions detected by the feature extraction module 204 may generate electric signals that may either imitate or render virtual instruments like heavy-metal electric guitar, an electric piano, an organ, flute, vocals, etc.; or even natural sounds like ocean waves, etc.; or generate new electronic timbres through a synthesizer application.

The synthesizer application may use various methods to generate electronic signals (sounds). Some waveform synthesis applications include subtractive synthesis, additive synthesis, wavetable synthesis, frequency modulation synthesis, phase distortion synthesis, physical modeling synthesis and sample-based synthesis. Other synthesis applications include subharmonic synthesis, a form of additive synthesis via subharmonics and granular synthesis, sample-based synthesis based on grains of sound, generally resulting in soundscapes or clouds. While usually generated by a musical keyboard, the synthesizer application of FIG. 2 is controlled by the natural behavior or movement of the driver or occupant of vehicle 100 as sensed and processed through the multimodal user interface.

Figure 3:
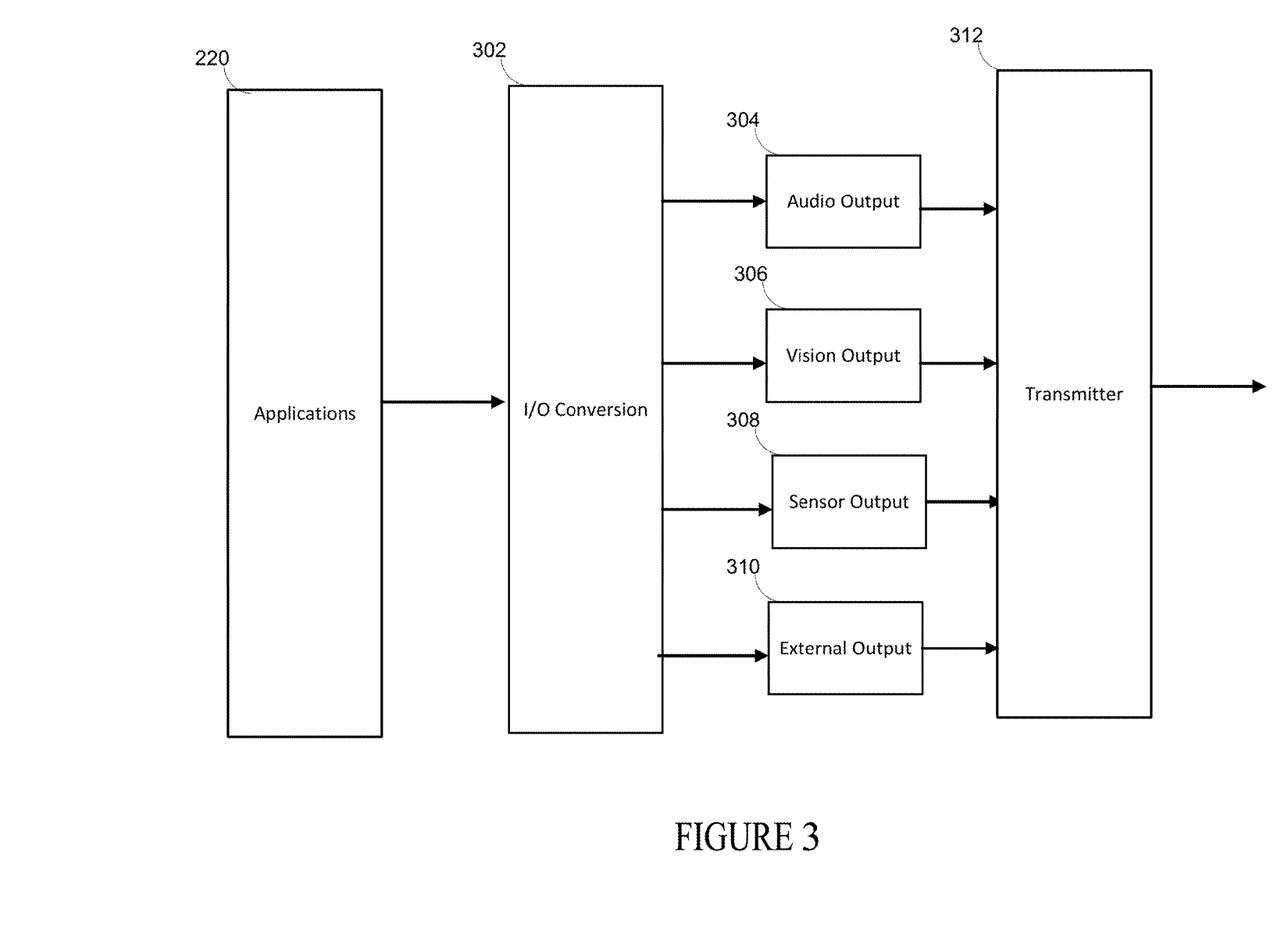
FIG. 3 is a multimodal user interface that transmits aural, vision, and hepatic output.

In FIG. 3 the multimodal user interface uses input/output processor 302 to handle the I/O conversions and the output operations. The input/output processor is dedicated to the time sensitive tasks of relaying the audio 304, video 306, sensor (e.g., hepatic signals) and external output to transmitter 312 that includes error detection and control, receipt, transmission and/or the encoding of messages, and in some instances, the management and running of the external devices.

Figure 4:
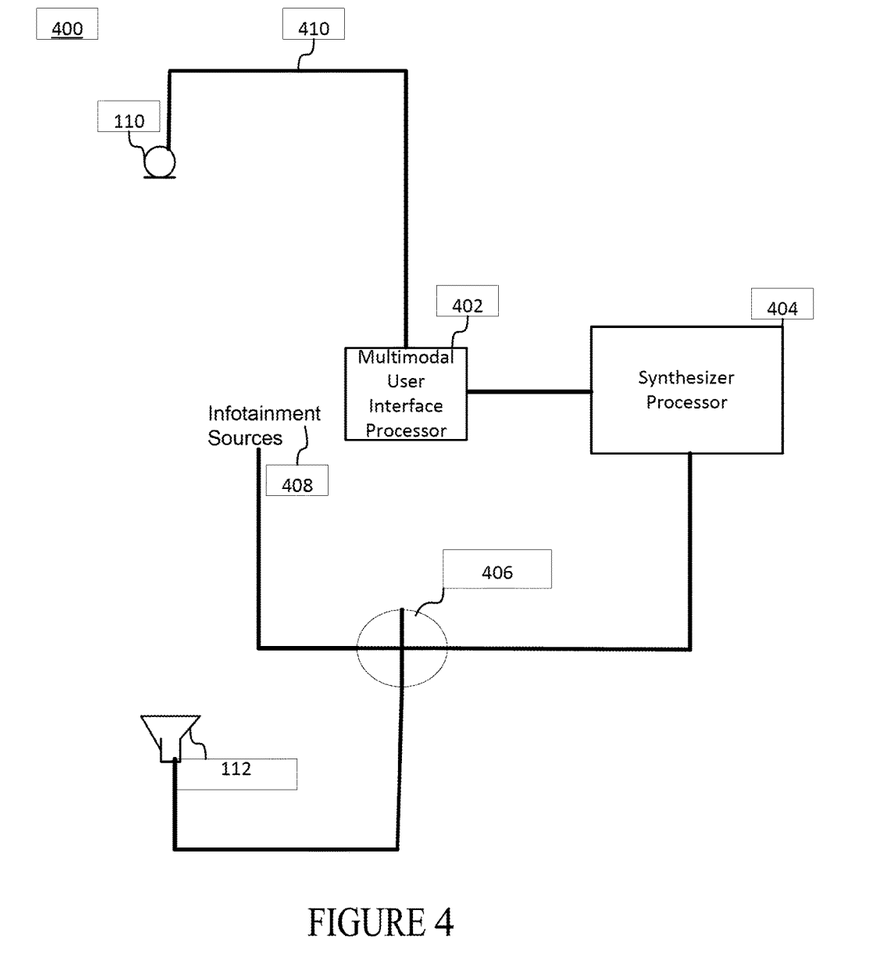
FIG. 4 is a block diagram of a second multimodal user interface that translates user interactions into actions in a virtual environment.

FIG. 4 is a schematic representation of the multimodal user interface. The system 400 is an example system for use in a vehicle 400. The example system configuration includes one or more microphones 110, two or more audio transducers 112, a multimodal user interface processor 402, a synthesizer processor 404 and a signal adder 406. The one or more microphones 110 may capture the audio signal associated with the user and the signals associated with the infotainment sources 408 creating one or more captured audio signal 410. The synthesizer processor 312 generates various audio effects that imitate other sounds or generate new electronic timbres that is added to the signals sourced by the infotainment sources 408 through signal adder 406.

Figure 5:
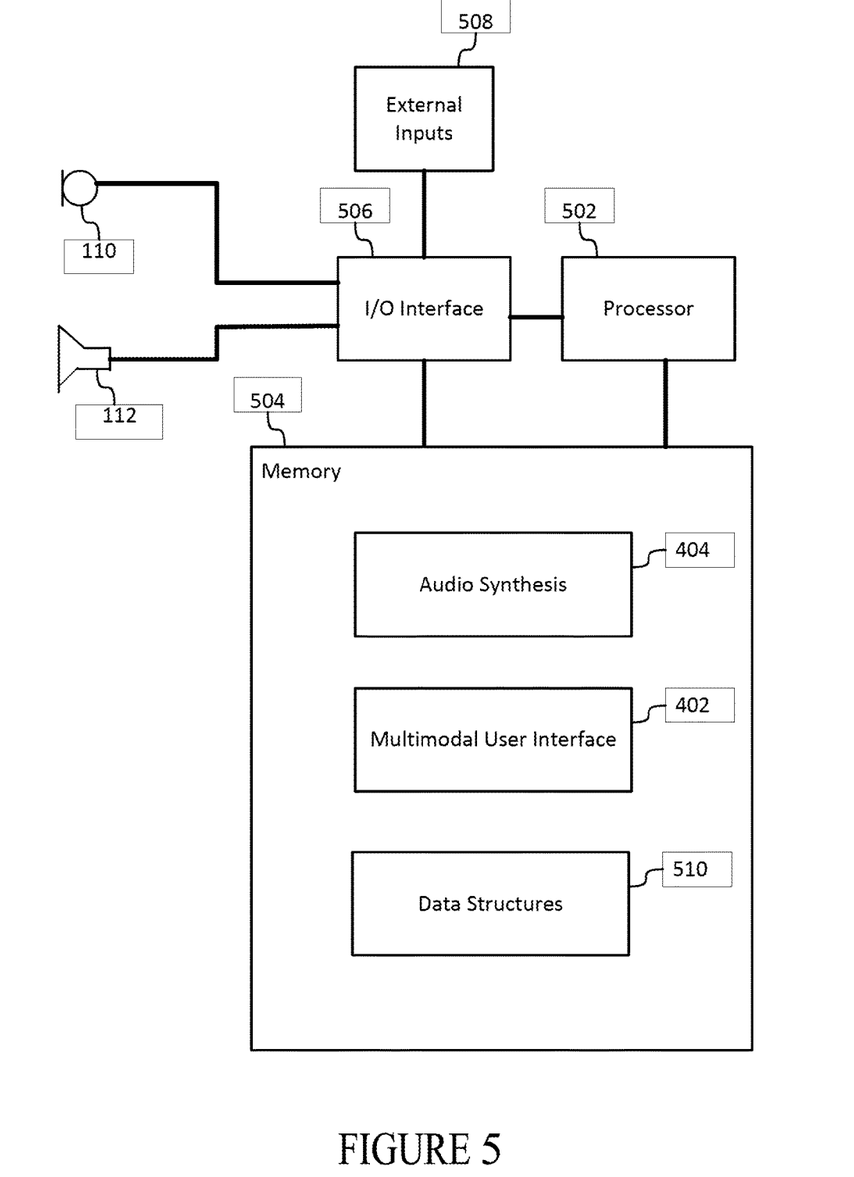
FIG. 5 is a block diagram of a second multimodal user interface that translates user interactions into actions in a virtual environment.

FIG. 5 is a block diagram of a second multimodal user interface that translates user interactions into actions in a virtual environment. The system comprises a processor 502, a non-transitory media such as a memory 504 (the contents of which are accessible by the processor 502) and an I/O interface 506. The I/O interface 506 of FIG. 5 may be used to connect devices such as, for example, additional microphones, audio transducers or loudspeakers, and receive external inputs 508 from other local or remote sources. The memory 504 may store instructions which when executed by the processor 502 causes the system to render some or all of the functionality associated with the multimodal user interface as described herein. For example, the memory 504 may store instructions which when executed by the processor 502 causes the system to render the functionality associated with audio synthesis 404 and multimodal user interface 402. In addition, data structures, temporary variables and other information may store data in the memory 504.

The processors 302, 402, and 404 may comprise a single processor or multiple processors that may be disposed on a single chip, on multiple devices or distributed over more than one system. The processors 302, 402, and 404 may be hardware that executes computer executable instructions or computer code embodied in the memory 504 or in other memory to perform one or more features of the systems described herein. The processors 302, 402, and 404 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 504 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an echo cancellation, echo is removed by subtracting an estimated echo from the transmitted or received signal. And here, an audio transducer converts one form of energy into an aural signal.

The memory 504 may also store computer code, executable by the audio synthesis processor 404, the multimodal user interface 402, and the input/output processor 302, as described herein. The computer code may include instructions executable with the processors 402, 404, and 302. The computer code may be written in any computer language, such as C, C++, assembly language, channel program code, and/or any combination of computer languages. The memory 504 may store information in data structures including, for example, feedback and or echo canceller coefficients that render or estimate echo signal levels.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The system and process reinforces speech and enhances it without distortion or added noise in a vehicle. A vehicle may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

The system and process is fully automated such that application control is continuously adapted the user's natural interactions within the vehicle cabin. The system reduces driver fatigue that impairs mental processing and decision making abilities that increases the risks of accidents. It operates at low delay. The system can be implemented on or within other car systems such as an infotainment processor and digital signal processors or DSPs and co-exist and communicate with other system software. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A non-transitory machine-readable medium encoded with machine-executable instructions, wherein the machine-executable instructions, when executed by a processor, cause:
    capturing a user interaction via one or more sensors within a vehicle to generate one or more sensor signals, wherein the one or more sensors comprise an imaging device that generates one or more sensor signals comprising an image or video sequence;
    extracting features from frames of the image or video sequence;
    detecting gestures and movements in the user interaction through a spatiotemporal correlation between extracted features from consecutive frames of the image or video sequence through one or more of image subtraction or triggers activated by exceeding thresholds;
    determining one or more actions corresponding to one or more detected gestures or movements;
    synthesizing via a synthesizer a synthesized audio signal corresponding to the one or more actions in accordance with a set of rules;
    combining the synthesized audio signal with a primary audio signal to generate a combined audio signal; and
    reproducing the combined audio signal via one or more speakers sensors within the vehicle.

2. The non-transitory machine-readable medium of claim 1, wherein the processor is further programmed for causing rendering of a tactile feedback corresponding to the one or more actions corresponding to the one or more actions within the vehicle.

3. The non-transitory machine-readable medium of claim 1, wherein the processor is further programmed for causing rendering of a virtual feedback corresponding to the one or more actions through a vision system within the vehicle.

4. The non-transitory machine-readable medium of claim 1, wherein the one or more sensors comprise a plurality of ultrasonic sensors within the vehicle that generate one or more sensor signals comprising ultrasonic data, features being extracted from the ultrasonic data and the consecutive frames of the image or video sequence, wherein the one or more detected gestures or movements are detected based on the extracted features from the ultrasonic data and the consecutive frames of the image or video sequence.

5. The non-transitory machine-readable medium of claim 1, wherein the one or more sensors comprise radio frequency identification (RFID) sensors within the vehicle that generate one or more sensor signals comprising RFID-based movement data based on detected movement of RFID gloves, features being extracted from the RFID-based movement data and the consecutive frames of the image or video sequence, wherein the one or more detected gestures or movements are detected based on the extracted features from the RFID-based movement data and the consecutive frames of the image or video sequence.

6. The non-transitory machine-readable medium of claim 1, wherein detecting one or more gestures or movements in the user interaction through a spatiotemporal correlation between extracted features from consecutive frames of the image or video sequence comprises determining a rate of change of the extracted features through the image subtraction.

7. The non-transitory machine-readable medium of claim 1, wherein detecting one or more gestures or movements in the user interaction through a spatiotemporal correlation between extracted features from consecutive frames of the image or video sequence comprises determining a rate of change of the extracted features through the triggers activated by exceeding thresholds.

8. The non-transitory machine-readable medium of claim 1, wherein the one or more sensors comprise pressure sensors or touch sensors that detect one or more of touch or movement, wherein the one or more detected gestures or movements are detected based on the touch or movement detected by the pressure sensors or touch sensors and the extracted features from the consecutive frames of the image or video sequence.

9. A method of interacting with an entertainment system with a vehicle, comprising:
    capturing a user interaction via one or more sensors within the vehicle to generate one or more sensor signals, wherein the one or more sensors comprise an imaging device that generates one or more sensor signals comprising an image or video sequence;
    extracting features from frames of the image or video sequence;
    detecting gestures and movements in the user interaction through a spatiotemporal correlation between extracted features from consecutive frames of the image or video sequence through one or more of image subtraction or triggers activated by exceeding thresholds;
    determining one or more actions corresponding to one or more detected gestures or movements;

synthesizing via a synthesizer a synthesized audio signal corresponding to the one or more actions in accordance with a set of rules;

combining the synthesized audio signal with a primary audio signal to generate a combined audio signal; and reproducing the combined audio signal via one or more speakers within the vehicle.

10. The method of claim 9, further comprising:

rendering a tactile feedback corresponding to the one or more actions within the vehicle.

11. The method of claim 9, further comprising:

rendering a virtual feedback corresponding to the one or more actions in through a vision system within the vehicle.

12. The method of claim 9, wherein the one or more sensors comprise a plurality of ultrasonic sensors within the vehicle that generate one or more sensor signals comprising ultrasonic data, features being extracted from the ultrasonic data and the consecutive frames of the image or video sequence, wherein the one or more detected gestures or movements are detected based on the extracted features from the ultrasonic data and the consecutive frames of the image or video sequence.

13. The method of claim 9, wherein the one or more sensors comprise radio frequency identification (RFID) sensors within the vehicle that generate one or more sensor signals comprising RFID-based movement data based on detected movement of RFID gloves, features being extracted from the RFID-based movement data and the consecutive frames of the image or video sequence, wherein the one or more detected gestures or movements are detected based on the extracted features from the RFID-based movement data and the consecutive frames of the image or video sequence.

14. The method of claim 9, wherein detecting one or more gestures or movements in the user interaction through a spatiotemporal correlation between extracted features from consecutive frames of the image or video sequence comprises determining a rate of change of the extracted features through the image subtraction.

15. The method of claim 9, wherein detecting one or more gestures or movements in the user interaction through a spatiotemporal correlation between extracted features from consecutive frames of the image or video sequence comprises determining a rate of change of the extracted features through the triggers activated by exceeding thresholds.

16. The method of claim 9, wherein the one or more sensors comprise pressure sensors or touch sensors that detect one or more of touch or movement, wherein the one or more detected gestures or movements are detected based on the touch or movement detected by the pressure sensors or touch sensors and the extracted features from the consecutive frames of the image or video sequence.

17. The method of claim 9, further comprising:

determining a state of the vehicle state through one or more of accelerometers or a global positioning sensor (GPS) in the one or more sensors, wherein the one or more detected gestures or movements are detected based on the state of the vehicle and the extracted features from the consecutive frames of the image or video sequence.

18. The method of claim 9, wherein the one or more sensors comprise microphones for detecting sounds within the vehicle that generate one or more sensor signals comprising audio data, wherein the one or more detected gestures or movements are detected based on the detected sounds in the audio data and the extracted features from the consecutive frames of the image or video sequence.

19. An in-vehicle entertainment system, comprising:

one or more sensors that generate one or more sensor signals, the one or more sensors comprising an imaging device that generates one or more sensor signals comprising an image or video sequence;

one or more speakers;

a processor coupled to the one or more sensors and the one or more speakers, wherein the processor is programmed to:

capture a user interaction via the one or more sensors within a vehicle to generate one or more sensor signals, wherein the one or more sensors comprise an imaging device that generates one or more sensor signals comprising an image or video sequence;

extract features from frames of the image or video sequence;

detect gestures and movements in the user interaction through a spatiotemporal correlation between extracted features from consecutive frames of the image or video sequence through one or more of image subtraction or triggers activated by exceeding thresholds;

determine one or more actions corresponding to one or more detected gestures or movements;

synthesize via a synthesizer a synthesized audio signal corresponding to the one or more actions in accordance with a set of rules;

combine the synthesized audio signal with a primary audio signal to generate a combined audio signal; and reproduce the combined audio signal via the one or more speakers within the vehicle.

* * * * *

UNITED STATES PATENT AND TRADEMARK OFFICE
CERTIFICATE OF CORRECTION

PATENT NO. : 10,497,346 B2
APPLICATION NO. : 15/839348
DATED : December 3, 2019
INVENTOR(S) : Shreyas Anand Paranjpe et al.

It is certified that error appears in the above-identified patent and that said Letters Patent is hereby corrected as shown below:

In the Claims

Column 5, Line 65, please change "speakers sensors within the vehicle." to "speakers within the vehicle."

Signed and Sealed this
Sixth Day of December, 2022

Katherine Kelly Vidal
*Director of the United States Patent and Trademark Office*